United States Patent
Koch et al.

(10) Patent No.: US 9,765,159 B2
(45) Date of Patent: Sep. 19, 2017

(54) REDISPERSIBLE NANOPARTICLES

(75) Inventors: Matthias Koch, Wiesbaden (DE); Gerhard Jonschker, Heppenheim (DE); Joerg Pahnke, Darmstadt (DE)

(73) Assignee: MERCK PATENT GMBH, Darmstadt (DE)

( * ) Notice: Subject to any disclaimer, the term of this patent is extended or adjusted under 35 U.S.C. 154(b) by 1949 days.

(21) Appl. No.: 12/293,166

(22) PCT Filed: Feb. 21, 2007

(86) PCT No.: PCT/EP2007/001495
§ 371 (c)(1),
(2), (4) Date: Sep. 16, 2008

(87) PCT Pub. No.: WO2007/107222
PCT Pub. Date: Sep. 27, 2007

(65) Prior Publication Data
US 2009/0203838 A1    Aug. 13, 2009

(30) Foreign Application Priority Data

Mar. 17, 2006    (DE) .................. 10 2006 012 467

(51) Int. Cl.
| | | |
|---|---|---|
| *C08F 2/00* | (2006.01) | |
| *C08F 2/38* | (2006.01) | |
| *C08F 2/44* | (2006.01) | |
| *C08F 220/14* | (2006.01) | |
| *C08F 220/18* | (2006.01) | |
| *C08F 220/26* | (2006.01) | |

(52) U.S. Cl.
CPC .................. *C08F 2/00* (2013.01); *C08F 2/38* (2013.01); *C08F 2/44* (2013.01); *C08F 220/14* (2013.01); *C08F 220/18* (2013.01); *C08F 220/26* (2013.01); *Y10T 428/2995* (2015.01)

(58) Field of Classification Search
CPC ....................................... C08F 2/00
USPC ........................ 428/402, 405, 407
See application file for complete search history.

(56) References Cited

U.S. PATENT DOCUMENTS

| | | | |
|---|---|---|---|
| 5,399,642 A | 3/1995 | Emmons et al. | |
| 5,856,379 A * | 1/1999 | Shiratsuchi et al. | 523/209 |
| 7,001,673 B2 * | 2/2006 | Yamasaki et al. | 428/626 |
| 8,029,897 B2 * | 10/2011 | Poncet-Legrand et al. | 428/402 |
| 8,262,939 B2 * | 9/2012 | Kim et al. | 252/500 |
| 2002/0128502 A1 | 9/2002 | Su et al. | |
| 2003/0193037 A1 * | 10/2003 | Koyanagi et al. | 252/1 |
| 2003/0199653 A1 | 10/2003 | McCormick, III et al. | |
| 2004/0171728 A1 | 9/2004 | Xue et al. | |
| 2006/0144290 A1 | 7/2006 | Polk et al. | |
| 2006/0147674 A1 * | 7/2006 | Walker et al. | 428/141 |
| 2007/0154709 A1 * | 7/2007 | Koch et al. | 428/379 |

FOREIGN PATENT DOCUMENTS

| | | |
|---|---|---|
| EP | 0 541 272 A1 | 5/1993 |
| FR | 2 850 661 A1 | 8/2004 |
| WO | WO 03/000760 A1 | 1/2003 |
| WO | WO 2004/044061 * | 5/2004 |
| WO | WO 2005/000914 A1 | 1/2005 |
| WO | WO 2005/070820 A1 | 8/2005 |
| WO | WO 2005/105930 A1 | 11/2005 |
| WO | WO-2006 045713 | 5/2006 |

OTHER PUBLICATIONS

Sugimoto, Tadao, "Monodispersed Particles," 2001, pp. 422-427.
N. Tsubokawa et al., "Polymerization of Vinyl Monomers in the Presence of Silica Having Surface Functional Groups", Colloid & Polymer Science, vol. 271, No. 10 (1993) pp. 940-946.
Physico-Chemical Data for Aerosil products. (1 page).
Wengeler, R. et al. "Turbulent hydrodynamic stress induced dispersion and fragmentation of nanoscale agglomerates" Journal of Colloid and Interface Science 306:262-273 (2007).

* cited by examiner

*Primary Examiner* — Irina Krylova
(74) *Attorney, Agent, or Firm* — Millen, White, Zelano, Branigan, P.C.

(57)    ABSTRACT

The present invention relates to redispersible nanoparticles, to processes for the production thereof, and to the use thereof in formulations, surface coatings, paints and plastics.

24 Claims, No Drawings

REDISPERSIBLE NANOPARTICLES

The present invention relates to redispersible nanoparticles, to processes for the production thereof, and to the use thereof in formulations, surface coatings, paints and plastics or precursors thereof.

Nanoparticles are usually produced in aqueous dispersion and frequently have to be transferred into organic media. If, for example, the hydrophilic nanoparticle is introduced too quickly into a nonpolar environment, agglomeration of the particles occurs. For this reason, the standard methods are usually based on very slow solvent exchange, frequently via mediating solvents in large amount. These multistep processes are slow and complex.

Alternative processes start from agglomerated nanoparticles and disperse the latter using high shear forces at the same time as addition of surface modifiers.

The above-mentioned processes have the disadvantage that they either very complex and require high consumption of solvents, or the processes require high shear forces, which does not ensure complete breakdown of the agglomerates.

There is therefore a demand for nanoparticles and processes for the production thereof which can be produced in aqueous media and can be redispersed in organic media starting from these aqueous dispersions.

The present object is achieved by the provision of redispersible nanoparticles and the provision of processes for the production thereof in accordance with the present invention.

Accordingly, the present invention relates firstly to the provision of redispersible nanoparticles obtainable by
a) application of at least one surface modifier, where at least one surface modifier contains at least one functional group selected from the group consisting of thiols, sulfides, disulfides or polysulfides, to nanoparticles dispersed in a solvent, and
b) radical polymerisation in the presence of organic monomers, where the surface modifier containing at least one functional group selected from the group consisting of thiols, sulfides, disulfides or polysulfides applied in step a) functions as radical chain-transfer agent.

The present invention likewise relates to processes for the production of redispersible nanoparticles comprising the steps of
a) application of at least one surface modifier, where at least one surface modifier contains at least one functional group selected from the group consisting of thiols, sulfides, disulfides or polysulfides, to nanoparticles dispersed in a solvent, and
b) radical polymerisation in the presence of organic monomers, where the surface modifier containing at least one functional group selected from the group consisting of thiols, sulfides, disulfides or polysulfides applied in step a) functions as radical chain-transfer agent.

In a further embodiment of the present invention, the nanoparticles can be dispersed in a solvent before application of the surface modifier, but it is also possible to employ dispersions of nanoparticles directly. Production of the nanoparticles in dispersion and subsequent application of the surface modifiers without prior separation of the particles is likewise possible.

The above-mentioned solvent is selected from water, organic solvents or mixtures thereof.

Only the processes according to the invention give nanoparticles which can be redispersed in any desired media and solvents, in particular organic hydrophobic solvents, without major problems and losses of yield.

The at least two-step coating of the nanoparticles is essential to the invention. To this end, the nanoparticles are reacted in a first step with at least one surface modifier, where at least one surface modifier contains at least one functional group selected from the group consisting of thiols, sulfides, disulfides. If necessary, an interlayer, preferably of $SiO_2$ or melamine, can be applied to the nanoparticles before the surface modifiers are applied.

The surface modification is preferably chemical, i.e. the bonding takes place via hydrogen bonds, electrostatic interactions, chelate bonds or via covalent bonds. The surface modifier is preferably covalently bonded to the surface of the nanoparticle.

Suitable nanoparticles are selected from the group consisting of hydrophilic and hydrophobic, in particular hydrophilic, nanoparticles based on sulfates or carbonates of alkaline-earth metal compounds or on oxides or hydroxides of silicon, titanium, zinc, aluminium, cerium, cobalt, chromium, nickel, iron, yttrium or zirconium or mixtures thereof, which may optionally be coated with metal oxides or hydroxides, for example of silicon, zirconium, titanium, aluminium, or metals, such as, for example, Ag, Cu, Fe, Au, Pd, Pt or alloys, coated with metal oxides or hydroxides, for example of silicon, zirconium, titanium, aluminium. The individual oxides may also be in the form of mixtures. The metal of the metal oxide or hydroxide is preferably silicon. The particles preferably have an average particle size, determined by means of a Malvern ZETASIZER (particle correlation spectroscopy, PCS) or transmission electron microscope, of 3 to 200 nm, in particular of 5 to 30 nm and very particularly preferably of 6 to 20 nm. In specific, likewise preferred embodiments of the present invention, the distribution of the particle sizes is narrow, i.e. the variation range is less than 100% of the average, particularly preferably a maximum of 50% of the average.

The nanoparticles are particularly preferably selected from $SiO_2$ particles or are selected from ZnO or cerium oxide particles or $TiO_2$ particles, which may optionally be coated with metal oxides or hydroxides, for example of silicon, zirconium, titanium, aluminium.

In the case of ZnO or cerium oxide particles, the nanoparticles according to the invention can be employed as UV absorbers owing to the absorption properties of zinc oxide or cerium oxide. Suitable zinc oxide particles having a particle size of 3 to 50 nm are obtainable, for example, by a process in which, in a step a), one or more precursors of the ZnO nanoparticles are converted into the nanoparticles in an organic solvent, and, in a step b), the growth of the nanoparticles is terminated by addition of at least one modifier which is a precursor of silica when the absorption edge in the UV/VIS spectrum of the reaction solution has reached the desired value. The process and the suitable modifiers and process parameters are described in DE 10 2005 056622.7.

Alternatively, suitable zinc oxide particles can be produced by a process in which, in a step a), one or more precursors of the ZnO nanoparticles are converted into the nanoparticles in an organic solvent, and, in a step b), the growth of the nanoparticles is terminated by addition of at least one copolymer comprising at least one monomer containing hydrophobic radicals and at least one monomer containing hydrophilic radicals when the absorption edge in the UV/VIS spectrum of the reaction solution has reached the desired value. This process and the suitable copolymers, monomers and process parameters are described in DE 10 2005 056621.9.

It is also possible to use nanohectorites, which are marketed, for example, by Südchemie under the Optigel® brand or by Laporte under the Laponite® brand. Very particular preference is also given to silica sols (SiO$_2$ in water), prepared from ion-exchanged water-glass.

Common processes for the production of surface-modified nanoparticles start from aqueous particle dispersions, to which the surface modifier is added. However, the reaction with the surface modifiers can also be carried out in an organic solvent or in solvent mixtures. This applies, in particular, to ZnO nanoparticles. Preferred solvents are alcohols or ethers, where the use of methanol, ethanol, diethyl ether, tetrahydrofuran and/or dioxane or mixtures thereof is particularly preferred. Methanol has proven to be a particularly suitable solvent here. If desired, assistants, such as, for example, surfactants or protective colloids (for example hydroxypropylcellulose), may also be present during the reaction.

Particularly suitable surface modifiers are organofunctional silanes, quaternary ammonium compounds, carboxylic acids, β-diketonates, phosphonates, phosphonium and sulfonium compounds or mixtures thereof. At least one of the surface modifiers employed contains at least one functional group selected from the group consisting of thiols, sulfides or disulfides. The surface modifiers are preferably selected from the group of the organofunctional silanes.

The surface modifiers can be employed alone, as mixtures or mixed with further, optionally non-functional surface modifiers.

The surface modifier requirements described are satisfied, in particular, in accordance with the invention by an adhesion promoter which carries two or more functional groups. One group of the adhesion promoter reacts chemically with the oxide surface of the nanoparticle. Particularly suitable here are alkoxysilyl groups (for example methoxy-, ethoxysilanes), halosilanes (for example chlorosilanes) or acidic groups of phosphoric acid esters or phosphonic acids and phosphonic acid esters or carboxylic acids.

The groups described are linked to a second functional group via a spacer of varying length. This spacer comprises non-reactive alkyl chains, siloxanes, polyethers, thioethers or urethanes or combinations of these groups of the general formula $(C,Si)_nH_m(N,O,S)_x$, where n=1-50, m=2-100 and x=0-50. The functional group is thiol, sulfide, polysulfide, in particular tetrasulfide, or disulfide groups.

Besides the thiol, sulfide, polysulfide or disulfide groups, the adhesion promoter described above may contain further functional groups. The additional functional groups are, in particular, acrylate, methacrylate, vinyl, amino, cyano, isocyanate, epoxide, carboxyl or hydroxyl groups.

Silane-based surface modifiers are described, for example, in DE 40 11 044 C2. Surface modifiers based on phosphoric acid are obtainable, inter alia, as Lubrizol® 2061 and 2063 from LUBRIZOL (Langer&Co.). A suitable silane is, for example, mercaptopropyltrimethoxysilane. This and other silanes are commercially available, for example from ABCR GmbH & Co., Karlsruhe, or Sivento Chemie GmbH, Düsseldorf. Mercaptophosphonic acid or diethyl mercaptophosphonate may also be mentioned here as adhesion promoter.

It is particularly preferred according to the invention for the surface modifier to be an amphiphilic silane of the general formula $(R)_3Si—S_P-A_{hp}-B_{hb}$, where the radicals R may be identical or different and represent hydrolytically removable radicals, $S_P$ denotes either —O— or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms, $A_{hp}$ denotes a hydrophilic block, $B_{hb}$ denotes a hydrophobic block, and where at least one thiol, sulfide or disulfide group on $A_{hp}$ and/or $B_{hb}$ is in bonded form. The use of amphiphilic silanes gives rise to nanoparticles which can be redispersed particularly well, both in polar and in non-polar solvents.

The amphiphilic silanes contain a head group $(R)_3Si$, where the radicals R may be identical or different and represent hydrolytically removable radicals. The radicals R are preferably identical.

Suitable hydrolytically removable radicals are, for example, alkoxy groups having 1 to 10 C atoms, preferably having 1 to 6 C atoms, halogens, hydrogen, acyloxy groups having 2 to 10 C atoms and in particular having 2 to 6 C atoms or NR'$_2$ groups, where the radicals R' may be identical or different and are selected from hydrogen or alkyl having 1 to 10 C atoms, in particular having 1 to 6 C atoms. Suitable alkoxy groups are, for example, methoxy, ethoxy, propoxy or butoxy groups. Suitable halogens are, in particular, Br and Cl. Examples of acyloxy groups are acetoxy or propoxy groups. Oximes are furthermore also suitable as hydrolytically removable radicals. The oximes here may be substituted by hydrogen or any desired organic radicals. The radicals R are preferably alkoxy groups and in particular methoxy or ethoxy groups.

A spacer $S_P$ is covalently bonded to the above-mentioned head group and functions as connecting element between the Si head group and the hydrophilic block $A_{hp}$ and takes on a bridge function for the purposes of the present invention. The group $S_P$ is either —O— or straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms.

The $C_1$-$C_{18}$-alkyl group of $S_P$ is, for example, a methyl, ethyl, isopropyl, propyl, butyl, sec-butyl or tert-butyl, furthermore also pentyl, 1-, 2- or 3-methylbutyl, 1,1-, 1,2- or 2,2-dimethylpropyl, 1-ethylpropyl, hexyl, heptyl, octyl, nonyl, decyl, undecyl, dodecyl, tridecyl or tetradecyl group. It may optionally be perfluorinated, for example as difluoromethyl, tetrafluoroethyl, hexafluoropropyl or octafluorobutyl group.

A straight-chain or branched alkenyl having 2 to 18 C atoms, in which a plurality of double bonds may also be present, is, for example, vinyl, allyl, 2- or 3-butenyl, isobutenyl, sec-butenyl, furthermore 4-pentenyl, isopentenyl, hexenyl, heptenyl, octenyl, —$C_9H_{16}$, —$C_{10}H_{18}$ to —$C_{18}H_{34}$, preferably allyl, 2- or 3-butenyl, isobutenyl, sec-butenyl, furthermore preferably 4-pentenyl, isopentenyl or hexenyl.

A straight-chain or branched alkynyl having 2 to 18 C atoms, in which a plurality of triple bonds may also be present, is, for example, ethynyl, 1- or 2-propynyl, 2- or 3-butynyl, furthermore 4-pentynyl, 3-pentynyl, hexynyl, heptynyl, octynyl, —$C_9H_{14}$, —$C_{10}H_{16}$ to —$C_{18}H_{32}$, preferably ethynyl, 1- or 2-propynyl, 2- or 3-butynyl, 4-pentynyl, 3-pentynyl or hexynyl.

Unsubstituted saturated or partially or fully unsaturated cycloalkyl groups having 3-7 C atoms can be cyclopropyl, cyclobutyl, cyclopentyl, cyclohexyl, cycloheptyl, cyclopentenyl, cyclopenta-1,3-dienyl, cyclohexenyl, cyclohexa-1,3-dienyl, cyclohexa-1,4-dienyl, phenyl, cycloheptenyl, cyclohepta-1,3-dienyl, cyclohepta-1,4-dienyl or cyclohepta-1,5-dienyl groups, which substituted by $C_1$- to $C_6$-alkyl groups.

The spacer group $S_p$ is connected to the hydrophilic block $A_{hp}$. The latter can be selected from nonionic, cationic, anionic or zwitterionic hydrophilic polymers, oligomers or groups. In the simplest embodiment, the hydrophilic block comprises ammonium, sulfonium, phosphonium groups, alkyl chains containing carboxyl, sulfate and phosphate side groups, which may also be in the form of a corresponding salt, partially esterified anhydrides containing a free acid or salt group, OH-substituted alkyl or cycloalkyl chains (for example sugars) containing at least one OH group, NH- and SH-substituted alkyl or cycloalkyl chains or mono-, di-tri- or oligoethylene glycol groups. The length of the corresponding alkyl chains can be 1 to 20 C atoms, preferably 1 to 6 C atoms.

The nonionic, cationic, anionic or zwitterionic hydrophilic polymers, oligomers or groups here can be prepared from corresponding monomers by polymerisation by the methods which are generally known to the person skilled in the art. Suitable hydrophilic monomers here contain at least one dispersing functional group which from the group consisting of
(i) functional groups which can be converted into anions by neutralisers, and anionic groups, and/or
(ii) functional groups which can be converted into cations by neutralisers and/or quaternising agents, and cationic groups, and/or
(iii) nonionic hydrophilic groups.

The functional groups (i) are preferably selected from the group consisting of carboxyl, sulfonyl and phosphonyl groups, acidic sulfuric acid and phosphoric acid ester groups and carboxylate, sulfonate, phosphonate, sulfate ester and phosphate ester groups, the functional groups (ii) are preferably selected from the group consisting of primary, secondary and tertiary amino groups, primary, secondary, tertiary and quaternary ammonium groups, quaternary phosphonium groups and tertiary sulfonium groups, and the functional groups (iii) are preferably selected from the group consisting of omega-hydroxy- and omega-alkoxypoly(alkylene oxide)-1-yl groups.

If not neutralised, the primary and secondary amino groups can also serve as isocyanate-reactive functional groups.

Examples of highly suitable hydrophilic monomers containing functional groups (i) are acrylic acid, methacrylic acid, beta-carboxyethyl acrylate, ethacrylic acid, crotonic acid, maleic acid, fumaric acid or itaconic acid; olefinically unsaturated sulfonic or phosphonic acids or partial esters thereof; or mono(meth)acryloyloxyethyl maleate, mono (meth)acryloyloxyethyl succinate or mono(meth)acryloyloxyethyl phthalate, in particular acrylic acid and methacrylic acid.

Examples of highly suitable hydrophilic monomers containing functional groups (ii) are 2-aminoethyl acrylate and methacrylate or allylamine.

Examples of highly suitable hydrophilic monomers containing functional groups (iii) are omega-hydroxy- or omega-methoxypoly(ethylene oxide)-1-yl, omega-methoxypoly(propylene oxide)-1-yl, or omega-methoxypoly(ethylene oxide-co-polypropylene oxide)-1-yl acrylate or methacrylate, and hydroxyl-substituted ethylenes, acrylates or methacrylates, such as, for example, hydroxyethyl methacrylate.

Examples of suitable monomers for the formation of zwitterionic hydrophilic polymers are those in which a betaine structure occurs in the side chain. The side group is preferably selected from $-(CH_2)_m-(N^+(CH_3)_2)-(CH_2)_n-SO_3^-$, $-(CH_2)_m-(N^+(CH_3)_2)-(CH_2)_n-PO_3^{2-}$, $-(CH_2)_m-(N^+(CH_3)_2)-(CH_2)_n-O-PO_3^{2-}$ or $-(CH_2)_m-(P^+(CH_3)_2)-(CH_2)_n-SO_3^-$, where m stands for an integer from the range 1 to 30, preferably from the range from 1 to 6, particularly preferably 2, and n stands for an integer from the range from 1 to 30, preferably from the range 1 to 8, particularly preferably 3.

It may be particularly preferred here for at least one structural unit of the hydrophilic block to contain a phosphonium or sulfonium radical.

When selecting the hydrophilic monomers, it should be ensured that the hydrophilic monomers containing functional groups (i) and the hydrophilic monomers containing functional groups (ii) are preferably combined with one another in such a way that no insoluble salts or complexes are formed. By contrast, the hydrophilic monomers containing functional groups (i) or containing functional groups (ii) can be combined as desired with the hydrophilic monomers containing functional groups (iii).

Of the hydrophilic monomers described above, the monomers containing functional groups (i) are particularly preferably used.

The neutralisers for the functional groups (i) which can be converted into anions are preferably selected here from the group consisting of ammonia, trimethylamine, triethylamine, tributylamine, dimethylaniline, diethylaniline, triphenylamine, dimethylethanolamine, diethylethanolamine, methyldiethanolamine, 2-aminomethylpropanol, dimethylisopropylamine, dimethylisopropanolamine, triethanolamine, diethylenetriamine and triethylenetetramine, and the neutralisers for the functional groups (ii) which can be converted into cations are preferably selected from the group consisting of sulfuric acid, hydrochloric acid, phosphoric acid, formic acid, acetic acid, lactic acid, dimethylolpropionic acid and citric acid.

The hydrophilic block is very particularly preferably selected from mono-di- and triethylene glycol structural units.

The hydrophobic block $B_{hb}$ follows bonded to the hydrophilic block $A_{hp}$. The block $B_{hb}$ is based on hydrophobic groups or, like the hydrophilic block, on hydrophobic monomers which are suitable for polymerisation.

Examples of suitable hydrophobic groups are straight-chain or branched alkyl having 1-18 C atoms, straight-chain or branched alkenyl having 2-18 C atoms and one or more double bonds, straight-chain or branched alkynyl having 2-18 C atoms and one or more triple bonds, saturated, partially or fully unsaturated cycloalkyl having 3-7 C atoms, which may be substituted by alkyl groups having 1-6 C atoms. Examples of such groups have already been mentioned above. In addition, aryl, polyaryl, aryl-$C_1$-$C_6$-alkyl or esters having more than 2 C atoms are suitable. The said groups may, in addition, also be substituted, in particular by halogens, where perfluorinated groups are particularly suitable.

Aryl-$C_1$-$C_6$-alkyl denotes, for example, benzyl, phenylethyl, phenylpropyl, phenylbutyl, phenylpentyl or phenylhexyl, where both the phenyl ring and also the alkylene chain may be partially or fully substituted by F as described above, particularly preferably benzyl or phenylpropyl.

Examples of suitable hydrophobic olefinically unsaturated monomers for the hydrophobic block $B_{hp}$ are
(1) esters of olefinically unsaturated acids which are essentially free from acid groups, such as alkyl or cycloalkyl esters of (meth)acrylic acid, crotonic acid, ethacrylic acid, vinylphosphonic acid or vinylsulfonic acid having up to 20 carbon atoms in the alkyl radical, in particular methyl, ethyl, propyl, n-butyl, sec-butyl, tert-butyl, hexyl, ethyl-hexyl, stearyl and lauryl acrylate, methacrylate, crotonate, ethacrylate or vinylphosphonate or vinylsulfonate; cycloaliphatic esters of (meth)acrylic acid, crotonic acid, ethacrylic acid, vinylphosphonic acid or vinylsulfonic acid, in particular cyclohexyl, isobornyl, dicyclopentadienyl, octahydro-4,7-methano-1H-indenemethanol or tert-butylcyclohexyl(meth)acrylate, crotonate, ethacrylate, vinylphosphonate or vinylsulfonate. These may comprise minor amounts of polyfunctional alkyl or cycloalkyl esters of (meth)acrylic acid, crotonic acid or ethacrylic acid, such as ethylene glycol, propylene glycol, diethylene glycol, dipropylene glycol, butylene glycol, pentane-1,5-diol, hexane-1,6-diol, octahydro-4,7-methano-1H-indenedimethanol or cyclohexane-1,2-, -1,3- or -1,4-diol di(meth)acrylate, trimethylolpropane tri(meth)acrylate or pentaerythritol tetra(meth)acrylate and the analogous ethacrylates or crotonates. For the purposes of the present invention, minor amounts of polyfunctional monomers (1) are taken to mean amounts which do not result in crosslinking or gelling of the polymers;

(2) monomers which carry at least one hydroxyl group or hydroxymethyl-amino group per molecule and are essentially free from acid groups, such as hydroxyalkyl esters of alpha,beta-olefinically unsaturated carboxylic acids, such as hydroxyalkyl esters of acrylic acid, methacrylic acid and ethacrylic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate or ethacrylate; 1,4-bis(hydroxymethyl) cyclohexane, octahydro-4,7-methano-1H-indenedimethanol or methylpropanediol monoacrylate, monomethacrylate, monoethacrylate or monocrotonate; or products of the reaction of cyclic esters, such as, for example, epsilon-caprolactone, and these hydroxyalkyl esters;

olefinically unsaturated alcohols, such as allyl alcohol allyl ethers of polyols, such as trimethylolpropane monoallyl ether or pentaerythritol mono-, -di- or triallyl ether. The polyfunctional monomers are generally only used in minor amounts. For the purposes of the present invention, minor amounts of polyfunctional monomers are taken to mean amounts which do not result in crosslinking or gelling of the polymers, products of the reaction of alpha,beta-olefinically carboxylic acids with glycidyl esters of an alpha-branched monocarboxylic acid having 5 to 18 carbon atoms in the molecule. The reaction of acrylic or methacrylic acid with the glycidyl ester of a carboxylic acid containing a tertiary alpha-carbon atom can take place before, during or after the polymerisation reaction. The monomer (2) employed is preferably the product of the reaction of acrylic and/or methacrylic acid with the glycidyl ester of Versatic® acid. This glycidyl ester is commercially available under the name Cardura® E10. Reference is additionally made to Römpp Lexikon Lacke und Druckfarben [Römpp's Lexicon of Surface Coatings and Printing Inks], Georg Thieme Verlag, Stuttgart, New York, 0.1998, pages 605 and 606;

formaldehyde adducts of aminoalkyl esters of alpha,beta-olefinically unsaturated carboxylic acids and of alpha,beta-unsaturated carboxamides, such as N-methylol- and N,N-dimethylolaminoethyl acrylate, -aminoethyl methacrylate, -acrylamide and -methacrylamide; and olefinically unsaturated monomers containing acryloxysilane groups and hydroxyl groups, which can be prepared by reaction of hydroxy-functional silanes with epichlorohydrin 30 and subsequent reaction of the intermediate with an alpha,beta-olefinically unsaturated carboxylic acid, in particular acrylic acid and methacrylic acid, or hydroxyalkyl esters thereof;

(3) vinyl esters of alpha-branched monocarboxylic acids having 5 to 18 carbon atoms in the molecule, such as the vinyl esters of Versatic® acid, which are marketed under the VeoVa® brand;

(4) cyclic and/or acyclic olefins, such as ethylene, propylene, but-1-ene, pent-1-ene, hex-1-ene, cyclohexene, cyclopentene, norbornene, butadiene, isoprene, cyclopentadiene and/or dicyclopentadiene;

(5) amides of alpha,beta-olefinically unsaturated carboxylic acids, such as (meth)acrylamide, N-methyl -, N,N-dimethyl-, N-ethyl-, N,N-diethyl-, N-propyl-, N,N-dipropyl -, N-butyl-, N,N-dibutyl- and/or N,N-cyclohexylmethyl (meth)acrylamide;

(6) monomers containing epoxide groups, such as the glycidyl esters of acrylic acid, methacrylic acid, ethacrylic acid, crotonic acid, maleic acid, fumaric acid and/or itaconic acid;

(7) vinylaromatic hydrocarbons, such as styrene, vinyltoluene or alpha-alkylstyrenes, in particular alpha-methylstyrene;

(8) nitriles, such as acrylonitrile or methacrylonitrile;

(9) vinyl compounds, selected from the group consisting of vinyl halides, such as vinyl chloride, vinyl fluoride, vinylidene dichloride, vinylidene difluoride; vinylamides, such as N-vinylpyrrolidone; vinyl ethers, such as ethyl vinyl ether, n-propyl vinyl ether, isopropyl vinyl ether, n-butyl vinyl ether, isobutyl vinyl ether and vinyl cyclohexyl ether; and vinyl esters, such as vinyl acetate, vinyl propionate, and vinyl butyrate;

(10) allyl compounds, selected from the group consisting of allyl ethers and esters, such as propyl allyl ether, butyl allyl ether, ethylene glycol diallyl ether, trimethylolpropane triallyl ether or allyl acetate or allyl propionate; as far as the polyfunctional monomers are concerned, that stated above applies analogously;

(11) siloxane or polysiloxane monomers, which may be substituted by saturated, unsaturated, straight-chain or branched alkyl groups or other hydrophobic groups already mentioned above. Also suitable are polysiloxane macromonomers which have a number average molecular weight Mn of 1000 to 40,000 and contain on average 0.5 to 2.5 ethylenically unsaturated double bonds per molecule, such as polysiloxane macromonomers which have a number average molecular weight Mn of 1000 to 40,000 and contain on average 0.5 to 2.5 ethylenically unsaturated double bonds per molecule; in particular polysiloxane macromonomers which have a number average molecular weight Mn of 2000 to 20,000, particularly preferably 2500 to 10,000 and in particular 3000 to 7000, and contain on average 0.5 to 2.5, preferably 0.5 to 1.5, ethylenically unsaturated double bonds per molecule, as described in DE 38 07 571 A 1 on pages 5 to 7, DE 37 06 095 A 1 in columns 3 to 7, EP 0 358 153 B 1 on pages 3 to 6, in U.S. Pat. No. 4,754,014 A 1 in columns 5 to 9, in DE 44 21 823 A 1 or in International Patent Application WO 92/22615 on page 12, line 18, to page 18, line 10; and

(12) monomers containing carbamate or allophanate groups, such as acryloyloxy- or methacryloyloxyethyl, -propyl or -butyl carbamate or allophanate; further examples of suitable monomers which contain carbamate groups are described in the patent specifications U.S. Pat. Nos. 3,479,328 A 1, 3,674,838 A 1, 4,126,747 A 1, 4,279,833 A 1 or 4,340,497 A 1.

The polymerisation of the above-mentioned monomers can be carried out in any way known to the person skilled in the art, for example by polyadditions or cationic, anionic or radical polymerisations. Polyadditions are preferred in this connection since different types of monomer can thus be combined with one another in a simple manner, such as, for example, epoxides with dicarboxylic acids or isocyanates with diols.

The respective hydrophilic and hydrophobic blocks can in principle be combined with one another in any desired manner. The amphiphilic silanes in accordance with the present invention preferably have an HLB value in the range 2-19, preferably in the range 4-15. The HLB value is defined here as $$HLB = \frac{\text{mass of polar fractions}}{\text{molecular weight}} \cdot 20$$

and indicates whether the silane has more hydrophilic or hydrophobic behaviour, i.e. which of the two blocks $A_{hp}$ and $B_{hb}$ dominates the properties of the silane according to the invention. The HLB value is calculated theoretically and arises from the mass fractions of hydrophilic and hydrophobic groups. An HLB value of 0 indicates a lipophilic compound, a chemical compound having an HLB value of 20 has only hydrophilic fractions.

The suitable amphiphilic silanes are furthermore distinguished by the fact that at least one thiol, sulfide or disulfide group is bonded to $A_{hp}$ and/or $B_{hb}$. The reactive functional group is preferably located on the hydrophobic block $B_{hb}$, where it is particularly preferably bonded to the end of the hydrophobic block. In the preferred embodiment, the head group $(R)_3Si$ and the thiol, sulfide or disulfide group have the greatest possible separation. This enables particularly flexible setting of the chain lengths of blocks $A_{hp}$ and $B_{hb}$ without significantly restricting the possible reactivity of the thiol, sulfide or disulfide group, for example with the ambient medium.

In addition, besides the thiol, sulfide, polysulfide or disulfide group, further reactive functional group may be present, in particular selected from silyl groups containing hydrolytically removable radicals, OH, carboxyl, NH, SH groups, halogens or reactive groups containing double bonds, such as, for example, acrylate or vinyl groups. Suitable silyl groups containing hydrolytically removable radicals have already been described above in the description of the head group $(R)_3Si$. The additional reactive group is preferably an OH group.

The nanoparticles modified in this way are then reacted, in a second step, in the course of a radical polymerisation in the presence of organic monomers, where the surface modifier applied in the first step functions as radical chain-transfer agent. A polymer chain growing as a free radical is able, for example, to abstract the hydrogen from an SH group and thus produces a new free radical on the sulfur which is capable of initiating a new polymer chain.

The process for the production of the nanoparticles according to the invention can accordingly be summarized as follows by way of example:

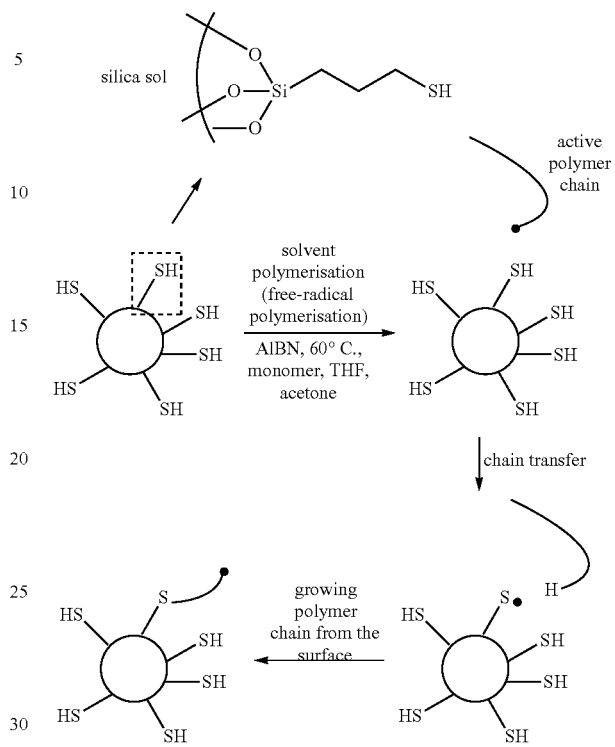

Suitable monomers are in general all those which are able to react with the applied surface modifier under radical polymerisation conditions that are known to the person skilled in the art. Suitable for this purpose are common organic monomers, such as, for example, acrylates, methacrylates, vinyl monomers or styrene derivatives. Particular preference is given to methacrylates, such as, for example, lauryl methacrylate, n-butyl methacrylate and methyl methacrylate, as well as styrene.

Also particularly suitable are organic monomers containing functional groups, where the functional groups can be selected, for example, from the group of the OH, NH, COOH, alkoxysilyl or epoxide groups. In particular, the functional group is an OH group. Overall, monomer mixtures with and without OH groups are involved.

Examples of highly suitable monomers containing functional groups are acrylic acid, methacrylic acid, beta-carboxyethyl acrylate, ethacrylic acid, crotonic acid, maleic acid, fumaric acid or itaconic acid; olefinically unsaturated sulfonic or phosphonic acids or partial esters thereof; or mono(meth)acryloyloxyethyl maleate, mono(meth)acryloyloxyethyl succinate or mono(meth)acryloyloxyethyl phthalate, in particular acrylic acid and methacrylic acid.

Further examples of highly suitable monomers containing functional groups are 2-aminoethyl acrylate and methacrylate or allylamine.

Further suitable monomers containing functional groups are omega-hydroxy- or omega-methoxypoly(ethylene oxide)-1-yl, omega-methoxypoly(propylene oxide)-1-yl, or omega-methoxypoly(ethylene oxide-co-polypropylene oxide)-1-yl acrylate or methacrylate, and hydroxyl-substituted ethylenes, acrylates or methacrylates, such as, for example, hydroxyethyl methacrylate or hydroxypropyl methacrylate.

Examples of suitable monomers for the formation of zwitterionic hydrophilic polymers are those in which a betaine structure occurs in the side chain. The side group is preferably selected from —$(CH_2)_m$—$(N^+(CH_3)_2)$—$(CH_2)_n$—$SO_3^-$, —$(CH_2)_m$—$(N^+(CH_3)_2)$—$(CH_2)_n$—$PO_3^{2-}$, —$(CH_2)_m$—$(N^+(CH_3)_2)$—$(CH_2)_n$—O—$PO_3^{2-}$ or $(CH_2)_m$—$(P^+(CH_3)_2)$—$(CH_2)_n$—$SO_3^-$, where m stands for an integer from the range 1 to 30, preferably from the range from 1 to 6, particularly preferably 2, and n stands for an integer from the range from 1 to 30, preferably from the range 1 to 8, particularly preferably 3.

In principle, all ways of initiating the radical polymerisation that are known to the person skilled in the art are suitable. The radical polymerisation is preferably initiated in a manner known to the person skilled in the art using AIBN or AIBN derivatives.

All process types known to the person skilled in the art are likewise suitable for carrying out the polymerisation. For example, the monomers and the radical initiator can be added in one step, which is the preferred embodiment. Furthermore, it is also possible for the monomers and the radical initiators to be added stepwise, for example with post-initiation and addition of the monomers in portions. It is furthermore also possible to modify the monomer composition stepwise in the course of the polymerisation, for example by time-controlled addition firstly of hydrophilic monomers, then hydrophobic monomers, or vice versa. This is possible, in particular, on use of a controlled radical polymerisation process known to the person skilled in the art.

If the solvent mixture and monomers are selected so that, although the monomers are soluble, the polymers formed therefrom are, however, no longer soluble from a certain chain length, the particles precipitate out of the reaction mixture. The thickness of the polymer shell formed can thus be controlled. The polymer shell simultaneously protects the particles effectively against irreversible coalescence.

The precipitated modified particles can be separated off from the free polymer present in the reaction medium or from unreacted surface modifiers. This can be carried out by standard methods known to the person skilled in the art. In a preferred embodiment, the polymerisation is carried out in a solvent or solvent mixture in which the monomers are soluble, but the polymers formed are insoluble from a certain chain length. The functionalised particles consequently precipitate out of the reaction solution. Polymer growth on the surface of the precipitated particles is virtually impossible, meaning that residual monomers and any unreacted reagents still in solution during the production of the particles or the functionalisation thereof or dissolved by-products can be separated off easily, for example by filtration. The precipitated particles can be redispersed in a suitable solvent corresponding to the polymer shell formed on them.

However, the particles according to the invention can also be employed directly as a mixture with free polymers. This enables the dispersibility of the particles to be improved.

The surface-modified nanoparticles obtained in this way can be dispersed in a simple manner in a new medium. In the simplest case, the nanoparticles are mixed with the dispersion medium.

As a result of the present invention, singular particles whose surface have been modified with surface modifiers and polymers are preferably obtained. The said particles can thus be referred to as core/shell particles, in which the core, the original nanoparticle, is surrounded by a shell of surface modifier and polymer. The proportion of core in the particle as a whole is usually 10-80% by weight, preferably 20-70% by weight, in particular 35-65% by weight and very particularly preferably 40-55% by weight. The proportions are determined here by thermogravimetric analysis (TGA). The ignition residue ($SiO_2$ proportion) of the dried core/shell particles is determined (instrument: TGA V4.OD Dupont 2000), heating rate: 10 K/min, temperature range 25-1000° C. in air, platinum crucible).

The present invention likewise relates to the use of the nanoparticles according to the invention in formulations, surface coatings, paints and plastics or in precursors thereof. The particles according to the invention are preferably employed here as additive in the said systems. The particles according to the invention are added to the respective application systems in the usual amounts known to the person skilled in the art. This can take place directly in the case of the preparation of the formulation, surface coating or paint or by incorporation of the particles into already existing systems. The said systems are preferably transparent systems.

The present invention likewise relates to formulations, surface coatings, paints, plastics comprising redispersible nanoparticles in accordance with the present invention.

In the said applications, the improvement in the scratch resistance and chemicals resistance of varnishes (for example in commercially available powder coatings, UV-curing coatings, dual cure coatings) and plastics, such as, for example, polycarbonate or PMMA, can be achieved, for example. Other applications relate, for example, to transparent UV protection or the transparent coloring of surface coatings and plastics with functional nanoparticles. The particles according to the invention can furthermore be employed for the modification of thermoplastics, adhesives and sealants, and foams for improving the mechanical, chemical and/or thermal properties.

The particles according to the invention can furthermore be employed as centers of scattering for short-wave radiation (UV) in applications which are transparent to the eye. According to the Rayleigh formula, the light scattered at nanoparticles increases to the fourth power with reducing wavelength. It is thus possible to employ nanoparticles of a size and refractive index which have no or only very slight light scattering in visible light, but scatter light to an increased extent in the shorter-wave UV A-C region. Since the weathering stability of a layer depends, inter alia, on the overall exposure to UV light, the weathering stability is thus improved and UV absorbers are unnecessary.

Furthermore, the polymers on the particle surface can be selected in such a way that the particles migrate to the coating interface during evaporation of the solvents and thus form a gradient with advantageous mechanical properties. The polymer-coated nanoparticles according to the invention may also carry silicone, long-chain alkyl and/or fluoroalkyl groups in the side chain. Specific incompatibilities with solvents and other binder components are thus created, which have the effect that the nanoparticles tend to accumulate at the air interface. The consequence is a gradient in the nanoparticle concentration from the air to the substrate side. Increased mechanical resistance can thus be achieved on the upper side of the coating without having to fill the entire volume of the coating with nanoparticles. This has economic advantages and avoids problems such as brittleness or poor adhesion.

In addition, it is possible to combine the above-mentioned effects in a preferred manner. This results in floating particles which exert a light-scattering action in the short-wave region and may additionally have UV absorbers in the polymer side chain. The UV protection is thus transported to where it is the most effective: close to the surface, together with simultaneous mechanical stabilisation. The advantage of this solution is that substances which are needed principally on the surface of the coating can be transported and fixed there by the vehicle of the nanoparticles. Using the example of UV absorbers and HALS, polymerisable absorbers and HALS derivatives, such as, for example, benzophenone acrylate, would be polymerised into the polymer side chain and silicone, long-chain alkyl and/or fluoroalkyl radicals would simultaneously be used. Due to the incompatibilities thus created, the nanoparticles accumulate at the surface of the coating, where they are fixed by crosslinking. The UV absorber is then present in a high concentration on the upper side of the coating and can effectively protect deeper coating layers. Whereas the UV rays penetrate into the material much more deeply in the case of homogeneously distributed UV absorbers of the same concentration and can damage it before encountering an absorber molecule, the radiation is effectively filtered by absorbers present at the surface. In conventional surface coatings, however, the UV absorbers cannot be concentrated at the surface without massively impairing the mechanical properties of the coatings. UV absorbers with silicone or fluoroalkyl side chains are accessible in principle, but would have a pronounced plasticiser action which massively reduces the scratch resistance. Only the combination of hardness-increasing nanoparticles and UV absorbers enables a significant absorber concentration to be brought to the layer surface without impairing the mechanical layer properties.

The following examples merely illustrate the invention without restricting the scope of protection. In particular, the features, properties and advantages described therein of the defined compound(s) on which the relevant example is based can also be applied to other substances and compounds which are not mentioned in detail, but fall within the scope of protection of the claims, unless stated otherwise elsewhere.

EXAMPLES

Example 1

800 g of a 25% aqueous silica sol solution (Levasil 300/30, H.C. Starck. Particle size: 8 nm) are diluted to 5% by weight with 3200 g of isopropanol. 9.78 g of 3-mercaptopropyltrimethoxysilane are added directly, and the mixture is stirred at room temperature for 18 h.

16 g of azobisisobutyronitrile (AIBN) and an acrylate/methacrylate mixture consisting of 155 ml of methyl methacrylate (MMA), 210 ml of n-butyl acrylate (nBA) and 39 ml of hydroxyethyl methacrylate (HEMA) are subsequently added.

The single-phase reaction solution is flushed with argon for 10 min and heated at 70° C. for 8 h. After the reaction time, the volatile constituents are removed in a rotary evaporator, leaving behind a tacky, colorless paste, which is then dissolved with butyl acetate in the desired ratio.

The $SiO_2$/polymer ratio is determined by TGA as 32% by weight of $SiO_2$/68% by weight of polymer (calculated theoretically from the initial weights: 34% by weight of $SiO_2$/66% by weight of polymer).

Example 2

270 g of a 27.8% aqueous silica sol solution (Levasil 300/30, H.C. Starck. Particle size: 8 nm) are diluted to 5% by weight with 1230 g of isopropanol. 7.334 g of 3-mercaptopropyltrimethoxysilane are added directly, and the mixture is stirred at room temperature for 18 h.

6 g of azobisisobutyronitrile (AIBN) and an acrylate/methacrylate mixture consisting of 67.4 ml of methyl methacrylate (MMA), and 8.5 ml of hydroxyethyl methacrylate (HEMA) are subsequently added.

The single-phase reaction solution is flushed with argon for 10 min and heated at 70° C. for 8 h. After the reaction time, the volatile constituents are removed in a rotary evaporator, leaving behind a tacky, colorless paste, which is then dissolved with butyl acetate in the desired ratio.

The $SiO_2$/polymer ratio is determined by TGA as 51% by weight of $SiO_2$/49% by weight of polymer (calculated theoretically from the initial weights: 51% by weight of $SiO_2$/49% by weight of polymer).

Example 3

12.5 ml of methanol are added to 4.425 g of zinc acetate, and the mixture is subsequently heated to 53° C. by means of an oil bath and stirring. During the warming, 4.84 g of potassium trimethylsilanoate and 12.5 ml of methanol are mixed until the silanoate has dissolved. This mixture is then added to the zinc acetate by means of a syringe. After 30 min, 75.7 µl of mercaptopropyltrimethoxysilane are then added, and the mixture is stirred vigorously. 211.8 µl of hexadecyltrimethoxysilane are then added, and stirring is continued. 15 minutes after the addition, the initially clear solution becomes cloudy. The batch is stirred at 50° C. for 4.5 h. The supernatant solution is decanted off, 20 ml of methanol are added to the residue and decanted off. The residue is transferred into a bottle and made up to 32.6 g with THF, corresponding to a concentration of 5%.

10 g of the solution are transferred into a polymer reaction vessel, and 0.4 ml of methyl methacrylate, 0.52 ml of n-butyl acetate, 0.1 ml of 2-hydroxyethyl methacrylate and 40 mg of AIBN are added. The mixture is flushed with argon for 10 min and then stirred at about 55° C. in the reaction vessel for 18 h. The product is transferred into a round-bottomed flask and evaporated to about 10-20 g in a rotary evaporator. A further 15 ml of butyl acetate are then added, and the mixture is evaporated to a residue of about 4-5 g.

Example 4

Particles Suspended in the Surface Coating 100 mg of azobisisobutyronitrile (AIBN), 20 ml of tetrahydrofuran (THF) and 5 ml of an acrylate/methacrylate mixture consisting of 38% of methyl methacrylate (MMA), 40% of n-butyl acrylate (nBA), 20% of hydroxyethyl methacrylate (HEMA) and 2% of Fluowet AC800 (Clariant, fluoroalkyl acrylate) are added to 10 ml of a 25% aqueous silica sol solution (Levasil 300/30, H.C. Starck. Particle size: 8 nm). The single-phase reaction solutions are flushed with argon for 10 min and heated at 60° C. for 16 hours. After the reaction time, the volatile constituents are removed in a rotary evaporator, leaving behind a tacky, colorless paste. The modified silica sol can be redispersed in THF and in n-butyl acetate.

Example 5

Particles with UV Absorber Suspended in the Surface Coating 100 mg of azobisisobutyronitrile (AIBN), 20 ml of tetrahydrofuran (THF) and 5 ml of an acrylate/methacrylate mixture consisting of 36% of methyl methacrylate (MMA), 40% of n-butyl acrylate (nBA), 20% of hydroxyethyl methacrylate (HEMA), 2% of Fluowet AC800 (Clariant, fluoroalkyl acrylate) and 2% of benzophenone acrylate (polymerisable UV absorber) are added to 10 ml of a 25% aqueous silica sol solution (Levasil 300/30, H.C. Starck. Particle size: 8 nm). The single-phase reaction solutions are flushed with argon for 10 min and heated at 60° C. for 16 hours. After the reaction time, the volatile constituents are removed in a rotary evaporator, leaving behind a tacky, colorless paste. The modified silica sol can be redispersed in THF and in n-butyl acetate.

The invention claimed is:

1. Redispersed nanoparticles obtainable by:
   a) applying at least one surface modifier to nanoparticles dispersed in a first solvent, wherein said at least one surface modifier contains at least one functional group, wherein said least one functional group is a thiol, sulfide, disulfide, or polysulfide,
   b) subjecting said nanoparticles to radical polymerization in the presence of organic monomers, wherein said at least one surface modifier containing said at least one functional group applied in the step a) functions as radical chain-transfer agent, whereby the resultant particles are singular redispersible nanoparticles, whose surfaces have been modified, said singular redispersible nanoparticles are in the form of core/shell particles, wherein the nanoparticle is the core which is surrounded by the shell of the surface modifier and the produced polymer, and
   c) removing said first solvent and redispersing the redispersible nanoparticles in a second solvent that is different than said first solvent to obtain said redispersed nanoparticles, and wherein said second solvent is a hydrophobic solvent.

2. The redispersed nanoparticles according to claim 1, wherein said nanoparticles are based on (a) sulfates or carbonates of alkaline-earth metal compounds, (b) on oxides or hydroxides of silicon, titanium, zinc, aluminium, cerium, cobalt, chromium, nickel, iron, yttrium, zirconium, or mixtures thereof, wherein said nanoparticles are optionally coated with metal oxides or hydroxides, or (c) on metals coated with metal oxides or hydroxides.

3. The redispersed nanoparticles according to claim 2, wherein said nanoparticles are based on Ag, Cu, Fe, Au, Pd, Pt or alloys, coated with metal oxides or hydroxides.

4. The redispersed nanoparticles according to claim 1, wherein said nanoparticles are $SiO_2$ particles, ZnO particles optionally coated with metal oxides or hydroxides, cerium oxide particles optionally coated with metal oxides or hydroxides, or $TiO_2$ particles optionally coated with metal oxides or hydroxides.

5. The redispersed nanoparticles according to claim 4, wherein said nanoparticles are $SiO_2$ particles.

6. The redispersed nanoparticles according to claim 4, wherein said nanoparticles are ZnO particles optionally coated with metal oxides or hydroxides.

7. The redispersed nanoparticles according to claim 4, wherein said nanoparticles are cerium oxide particles optionally coated with metal oxides or hydroxides.

8. The redispersed nanoparticles according to claim 4, wherein said nanoparticles are $TiO_2$ particles optionally coated with metal oxides or hydroxides.

9. The redispersed nanoparticles according to claim 1, wherein said nanoparticles have an average particle size, determined by means of particle correlation spectroscopy or transmission electron microscope, of 3 to 200 nm, and the variation range in the particle size distribution is less than 100% of the average.

10. The redispersed nanoparticles according to claim 1, wherein said at least one surface modifier is an organofunctional silane, quaternary ammonium compound, carboxylic acid, phosphonate, phosphonium compound, sulfonium compound, or a mixture thereof.

11. A method of using the redispersed nanoparticles according to claim 1, said method comprising incorporating said redispersed nanoparticles in formulations, surface coatings, paints, adhesives, sealants, plastics, or precursors thereof.

12. A formulation, surface coating, paint, adhesive, sealant, plastic or precursor thereof comprising the redispersed nanoparticles according to claim 1.

13. The redispersed nanoparticles according to claim 1, wherein said at least one surface modifier is an organofunctional silane.

14. The redispersed nanoparticles according to claim 1, wherein said at least one surface modifier is mercaptopropyltrimethoxysilane, mercaptophosphonic acid, or diethyl mercaptophosphonate.

15. The redispersed nanoparticles according to claim 1, wherein the proportion of the core in said singular redispersible nanoparticles as a whole is 10-80% by weight.

16. The redispersed nanoparticles according to claim 1, wherein the proportion of the core in said singular redispersible nanoparticles as a whole is 20-70% by weight.

17. The redispersed nanoparticles according to claim 1, wherein the proportion of the core in said singular redispersible nanoparticles as a whole is 35-65% by weight.

18. The redispersed nanoparticles according to claim 1, wherein the proportion of the core in said singular redispersible nanoparticles as a whole is 40-55% by weight.

19. The redispersed nanoparticles according to claim 1, wherein said at least one surface modifier is 3-mercaptopropyltrimethoxysilane, and said organic monomers are acrylates, methacrylates, or mixtures thereof.

20. The redispersed nanoparticles according to claim 1, wherein said applying of said at least one surface modifier to nanoparticles is performed in a medium consisting of said nanoparticles, said at least one surface modifier, and said first solvent or a first solvent mixture.

21. The redispersed nanoparticles according to claim 1, wherein said radical polymerization is performed in a medium consisting of the surface modified nanoparticles, said organic monomers, at least one radical initiator, and said first solvent or a first solvent mixture.

22. The redispersed nanoparticles according to claim 1, wherein said at least one surface modifier is an amphiphilic silane of the formula $(R)_3Si-S_P-A_{hp}-B_{hb}$, wherein
   radicals R, which may be identical or different, are alkoxy groups having 1 to 10 C atoms, hydrogen, acyloxy groups having 2 to 10 C atoms or $NR'_2$ groups,
   radicals R', which may be identical or different, are hydrogen or alkyl having 1 to 10 C atoms,
   $S_P$ is either —O—, a straight-chain or branched alkyl having 1-18 C atoms, a straight-chain or branched alkenyl having 2-18 C atoms and one or more double bonds, a straight-chain or branched alkynyl having 2-18 C atoms and one or more triple bonds, or a saturated, partially or fully unsaturated cycloalkyl having 3-7 C atoms which is optionally substituted by alkyl groups having 1-6 C atoms,
   $A_{hp}$ is a hydrophilic block,
   $B_{hb}$ is a hydrophobic block, and said at least one thiol, sulfide or disulfide group is present in $A_{hp}$ and/or $B_{hb}$ in a bonded form.

23. A process for production of redispersible nanoparticles comprising:
   a) applying at least one surface modifier containing at least one functional group, wherein said least one functional group is a thiol, sulfide, disulfide, or polysulfide, to nanoparticles dispersed in a first solvent,
   b) subjecting said nanoparticles to radical polymerization in the presence of organic monomers, wherein said at least one surface modifier containing said at least one functional group functions as radical chain-transfer agent, wherein the resultant particles are singular redispersible nanoparticles, whose surfaces have been modified, said singular redispersible nanoparticles are in the form of core/shell particles, wherein the nanoparticle is the core which is surrounded by the shell of the surface modifier and the produced polymer and
   c) removing said first solvent and redispersing the redispersible nanoparticles in a second solvent that is different than said first solvent, and said second solvent is a hydrophobic solvent.

24. The process according to claim 23, wherein said first solvent is water, an organic solvent, or a mixture thereof.

* * * * *